Figure 1:
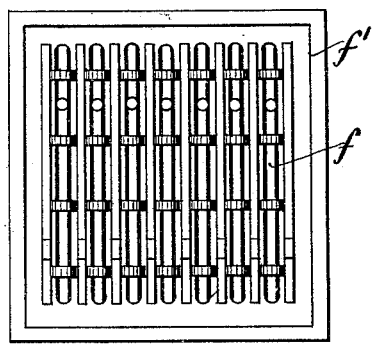

(No Model.)

H. H. LLOYD.
SECONDARY BATTERY.

No. 477,182. Patented June 14, 1892.

Witnesses:
Hermann Bormann
Thomas M. Smith.

Inventor:
Henry Herbert Lloyd.
by J. Walter Douglass.
att'y.

UNITED STATES PATENT OFFICE.

HENRY HERBERT LLOYD, OF PHILADELPHIA, PENNSYLVANIA, ASSIGNOR TO THE ELECTRIC STORAGE BATTERY COMPANY, OF GLOUCESTER CITY, NEW JERSEY.

SECONDARY BATTERY.

SPECIFICATION forming part of Letters Patent No. 477,182, dated June 14, 1892.

Application filed February 27, 1892. Serial No. 422,972. (No model.)

*To all whom it may concern:*

Be it known that I, HENRY HERBERT LLOYD, a subject of the Queen of Great Britain, but now residing at the city of Philadelphia, in the county of Philadelphia and State of Pennsylvania, have invented certain new and useful Improvements in Secondary or Storage Batteries, of which the following is a specification.

My invention relates in general to secondary or storage batteries composed of a series of plates, and more particularly to improvements in the plates, and in means for insulating and preventing disintegration of the same.

The principal objects of my present invention are, first, to provide a secondary or storage battery that is especially adapted for use under conditions that involve rough handling and heavy discharging of the plates thereof—for example, in traction work and the like—and, second, to provide a durable and comparatively inexpensive battery plate or electrode of great mechanical strength, of low internal resistance, and of high conductivity and in which substantially perfect electrical contact exists between the conducting support and the active material or material conditioned to become active and in which the active material is effectively protected from disintegration.

My improved battery-plate comprises a perforated conducting-support having pieces of active material or material to become active, as cast chloride of lead with or without an admixture of chloride of zinc, supported in the perforations thereof. It is, of course, important to prevent these pieces of active material from falling out of the perforations, and I attain this result by forming a rabbet or match joint between the adjacent portions of each of the pieces of active material and of the support. These rabbet or match joints not only impart great mechanical strength to the plate, but also reduce the internal resistance thereof, because of the close proximity of the conducting-support to all parts of the active material. Moreover, in producing my plate I cast the supporting material around the pieces of active material under heavy pressure, so that very perfect contact is obtained between the two, and this contact is, of course, improved by the expansion of the active material that always occurs during the operation of forming the plate. However, in the use of the above-described plate, in which the active material is to a certain extent enveloped by the support, a comparatively large surface of supporting material would be exposed to the action of the current, thus causing either serious corrosion of the support or waste of energy, due to the fact that gas would be given off at the support instead of doing useful work in oxidizing the active material. To obviate this defect, I protect the support from the action of the electric current by means of an acid-proof insulating-cover, and I design this insulating-covering in such manner that while the support is practically covered the active material is covered only to a slight extent. This result is important and is accomplished by providing clusters or groups of small holes or perforations in the insulating-covering opposite the active material, thus leaving the portions of the covering that overlie the support intact. This peculiar construction is productive of many beneficial results, of which the following may be particularly mentioned: first, the current following the path of least resistance (in this case the shortest path) attacks the active material only, it being understood that the solid portions of the covering set up sufficient additional resistance to protect the support, and, second, the bars between the perforations of the covering form a sort of net-work overlying the active material, and this net-work forms a mechanical support to the face of the active material or material to become active, and thereby prevents scaling or rapid disintegration of the same without interfering with the efficiency of the battery. In some instances additional perforations are provided, extending through the active material or material to become active and also through the overlying coverings, in order to afford the electrolyte additional access to the active material.

The nature and objects of my invention will be more fully understood from the following description, taken in connection with the accompanying drawings, forming part hereof, and in which—

Figure 2:
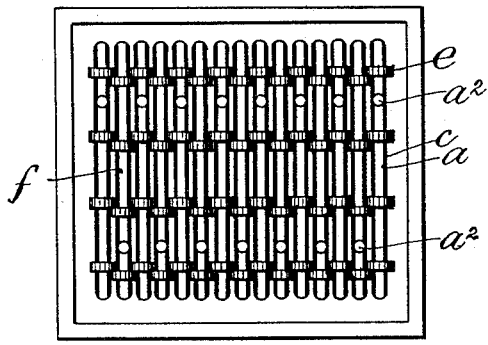
Figure 3:
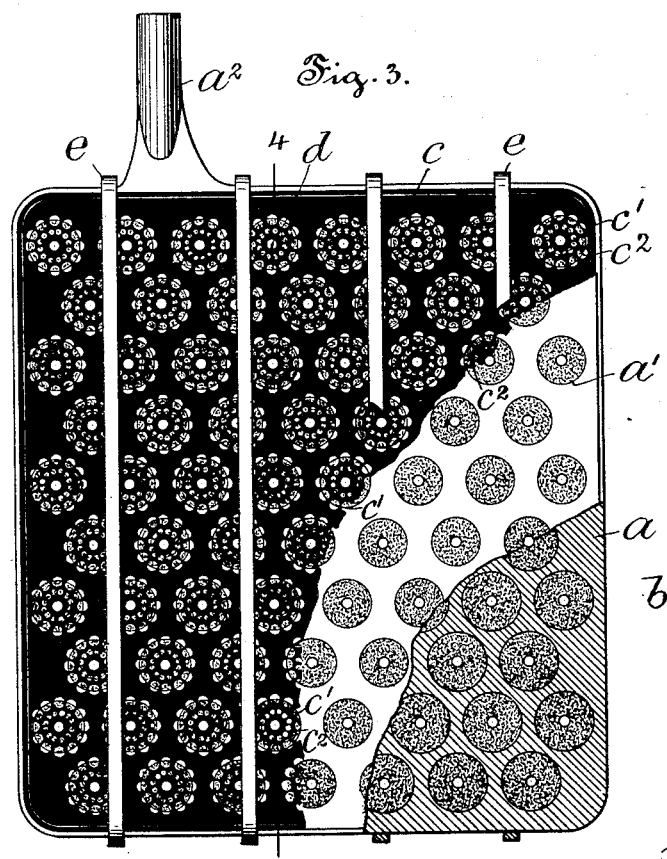
Figure 4:
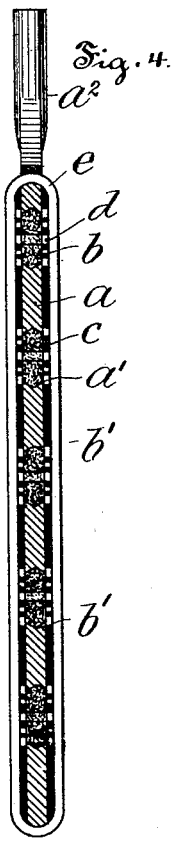

Figure 1 is a top or plan view of a vase or cell, showing a series of negative plates of lead or other material and a series of positive plates embodying features of my invention mounted therein. Fig. 2 is a similar view showing a series of positive and a series of negative plates embodying features of my invention. Fig. 3 is a side elevation, partly in section, of a plate or electrode embodying features of my invention and showing an exterior perforated insulating-covering, the face of the plate, and a central section of the same; and Fig. 4 is a transverse section on the line 4 4 of Fig. 3.

In the drawings, $a$ is a conducting-support provided with perforations $a'$ and with a lug or terminal $a^2$.

$b$ are pieces of active material or material conditioned to become active, as cast chloride of lead with or without an admixture of chloride of zinc, supported in the respective perforations $a'$, and having their ends substantially flush with the respective faces of the support $a$. These pieces $b$ of active material or material to become active are prevented from falling out of the perforations $a'$ by means of well-known rabbet or match joints $b'$ in substantially the same manner as the glass plates of windows are held to place in their supporting frame-work.

In producing the above-described plate the support $a$ is preferably dense and may be cast around the pieces $b$ of active material or material to become active under heavy pressure, so that very perfect contact is obtained between the two, and this contact is of course improved by the expansion of the pieces $b$ that always occurs during the operation of forming the plate. The faces of the support $a$ are protected by insulating coverings or plates $c$, made of celluloid, rubber, or other suitable material and provided with clusters or groups of holes or apertures $c'$, which, together with the bars $c^2$ between them, form a sort of net-work opposite to the respective faces of the pieces $b$ of active material or material to become active.

$d$ are channels that extend through the coverings or insulating-plates $c$ and through the pieces $b$ of active material or material to become active, and thus afford access to the internal portions of the active material or material to become active. These coverings or insulating-plates $c$ may be retained to place in contact with the respective faces of the supports by means of any suitable clamping devices—for example, by means of ordinary rubber bands $e$, which also serve to keep the electrodes or plates apart when they are mounted in battery.

In practice the hereinabove-described plates or electrodes may be prepared for use in a secondary battery or accumulator by mounting them as the positive plates $f$ in an electrolytic cell $f'$, in which the negative plates may be of lead or other preferred material, Fig. 1, and permitting the ensuing electrolysis to effect the conversion of the pieces $b$ into active material in the ordinary and well-understood manner. Two series of such plates may then be constituted the positive and negative plates in the vase or cell of a secondary battery or accumulator, Fig. 2. In both cases the rubber bands $e$ serve to keep the plates apart, and the latter may be charged and discharged in any preferred manner. During these operations the supports $a$ are protected from the action of the electric currents by the insulating covering or sheets $c$, so that corrosion of the supports is avoided and all the available current is utilized for oxidizing the active material. Moreover, the net-work comprising the bars $c^2$, that overlies the active material $b$, causes the current following the path of least resistance to attack only the active material, and, moreover, forms a mechanical support for the face of the active material or material to become active of the plates or electrodes, thereby preventing scaling or rapid disintegration of the active material and permitting the plates to be advantageously used under conditions which involve heavy discharging and rough handling—for example, in traction-work, which involves such conditions in a very marked degree.

Having thus described the nature and objects of my invention, what I claim as new, and desire to secure by Letters Patent, is—

1. A battery plate or electrode composed of a conducting-support and active material or material to become active and provided with insulating acid-proof sheets covering the support and having clusters or groups of holes or perforations disposed opposite the active material or material to become active, substantially as and for the purposes set forth.

2. In a secondary or storage battery, an acid-proof sheet adapted to cover a support and provided with clusters or groups of holes or perforations adapted to form a net-work over the active material or material to become active, substantially as and for the purposes set forth.

3. A secondary or storage battery comprising a vase or cell, an electrolyte, two series of plates composed, respectively, of a support and active material or material to become active, and insulating acid-proof sheets covering the faces of said supports and provided with groups of perforations constituting a net-work overlying the active material or material to become active, substantially as and for the purposes set forth.

4. A battery plate or element composed of a conducting-support and active material or material to become active and provided with insulating acid-proof sheets covering the support and having clusters or groups of holes or perforations disposed opposite the active material and one of said holes or perforations in line with an aperture extending through the active material or material to become active, substantially as and for the purposes set forth.

5. A battery plate or electrode composed of a conducting-support having pieces of active material or material conditioned to become active fitted into perforations in said support and having their ends substantially flush with the respective faces of said support and provided with insulating acid-proof sheets covering said supports and having groups or clusters of holes disposed opposite the exposed portions of the pieces of active material or material to become active, substantially as and for the purposes set forth.

In witness whereof I have hereunto set my signature in the presence of two subscribing witnesses.

HENRY HERBERT LLOYD.

Witnesses:
THOMAS M. SMITH,
RICHARD C. MAXWELL.